United States Patent [19]

McArthur

[11] 4,259,175
[45] Mar. 31, 1981

[54] PROCESS FOR REDUCING SOX EMISSIONS FROM CATALYTIC CRACKING UNITS

[75] Inventor: Dennis P. McArthur, Yorba Linda, Calif.

[73] Assignee: Union Oil Company of California, Los Angeles, Calif.

[21] Appl. No.: 949,755

[22] Filed: Oct. 10, 1978

[51] Int. Cl.³ .................. C10G 11/06; B01J 21/20; B01J 37/14
[52] U.S. Cl. .................. 208/113; 208/48 AA; 208/52 CT; 208/120; 208/121; 252/411 R; 252/455 Z; 423/244
[58] Field of Search .......... 208/113, 120, 121, 52 CT, 208/48 AA; 252/411 R, 417; 423/244, 247

[56] References Cited

U.S. PATENT DOCUMENTS

| | | | |
|---|---|---|---|
| 3,501,264 | 3/1970 | Pilato et al. | 423/419 P |
| 3,699,037 | 10/1972 | Annesser et al. | 208/120 |
| 3,835,031 | 9/1974 | Bertolacini et al. | 208/120 |
| 4,071,436 | 1/1978 | Blanton et al. | 208/120 |
| 4,115,249 | 9/1978 | Blanton et al. | 208/120 |
| 4,115,250 | 9/1978 | Flanders et al. | 208/120 |
| 4,115,251 | 9/1978 | Flanders et al. | 208/120 |
| 4,146,463 | 3/1979 | Radford et al. | 208/120 |
| 4,153,534 | 5/1979 | Vassalos | 208/120 |
| 4,153,535 | 5/1979 | Vassalos et al. | 208/120 |
| 4,166,787 | 9/1979 | Blanton et al. | 208/120 |

*Primary Examiner*—Herbert Levine
*Assistant Examiner*—G. E. Schmitkons
*Attorney, Agent, or Firm*—Gregory F. Wirzbicki; Dean Sandford

[57] ABSTRACT

Reduction of $SO_x$ emissions from the regenerator associated with the fluidized catalytic cracking (FCC) unit for converting hydrocarbon feedstocks into more valuable products is achieved by introducing into the FCC cycle one or more organic, aluminum-containing compounds in dissolved form. In the catalytic cracking zone, the dissolved aluminum-containing compounds are converted to aluminum compounds that deposit relatively uniformly upon the catalyst particles. Also depositing upon the catalyst particles in the catalytic cracking zone are deactivating quantities of sulfur-containing coke. When such catalyst particles are introduced into the regenerator, wherein the sulfur-containing coke present on the catalyst surfaces is removed by combustion, thereby activating the catalyst particles, the $SO_x$ so produced reacts with the deposited aluminum compounds to form one or more stable, sulfur-aluminum oxidic compounds, thus desulfurizing the regenerator flue gas.

Once deposited upon the catalyst particles, the aluminum compounds alternately react with the $SO_x$ compounds produced in the regenerator and then, by passage with the recycling catalyst particles through the catalytic cracking and steam stripping zones of the FCC unit, are converted to forms active for once again removing $SO_x$ compounds. Thus, just as the catalyst particles are alternately activated and deactivated for cracking hydrocarbons, the aluminum compounds dispersed on such catalyst particles undergo similar cyclical changes in activity with respect to $SO_x$ removal.

9 Claims, 1 Drawing Figure

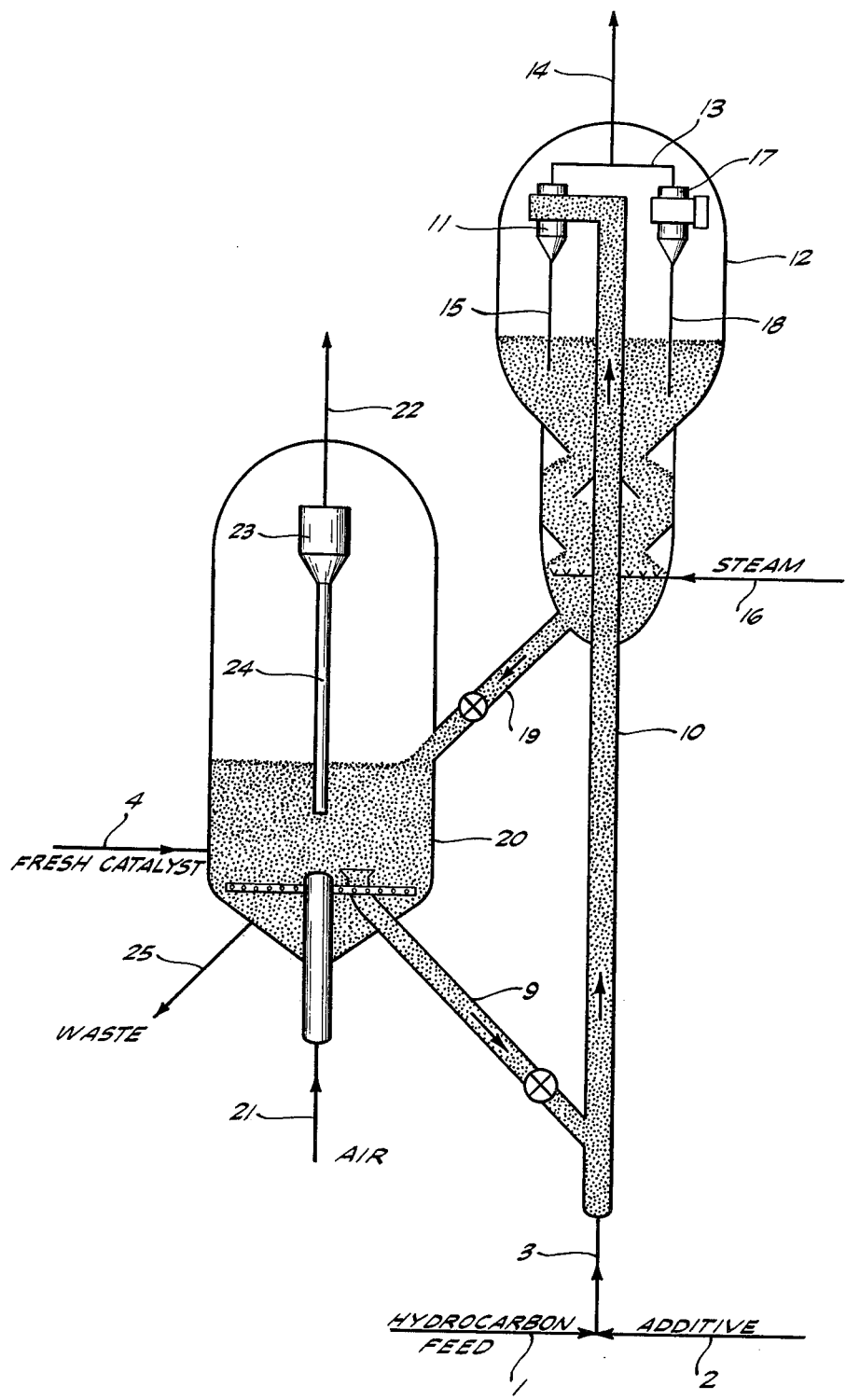

PROCESS FOR REDUCING SOX EMISSIONS FROM CATALYTIC CRACKING UNITS

BACKGROUND OF THE INVENTION

This invention relates to the reduction of $SO_x$ components in the flue gas discharged from the catalyst regenerator of catalytic cracking units, and especially fluidized catalytic cracking (FCC) units. More particularly, this invention relates to injecting into the FCC unit an aluminum-containing compound to reduce the amount of $SO_x$ emitted from the catalyst regenerator.

In the petroleum industry, high boiling hydrocarbon feedstocks are charged to FCC units so that, by contact with a moving bed of catalyst particles, the feedstock is converted to a more valuable hydrocarbon product, such as gasoline, having a lower average molecular weight and a lower average boiling point than said feedstock. The most typical hydrocarbon feedstock so treated in FCC units consists of heavy gas oil, but on occasion such feedstocks as light gas oils, naphtha, reduced crudes, and even whole crudes are also subjected to catalytic cracking to yield low boiling hydrocarbon products.

Catalytic cracking in FCC units is usually accomplished in a cyclic process involving catalytic reaction, steam stripping, and catalyst regeneration. The hydrocarbon feedstock is blended with an appropriate amount of catalyst particles, and the mixture so produced is then passed through a catalytic reactor, commonly called a riser, wherein a catalytic cracking reaction zone is maintained such that at a temperature between about 800° and 1100° F. the feedstock is converted into gaseous, lower boiling hydrocarbons. After these lower boiling hydrocarbons are separated from the catalyst in a suitable separator, such as a cyclone separator, the catalyst, now deactivated with coke deposited upon its surfaces, is passed to a stripper. In the stripper, the deactivated catalyst is contacted with steam so as to convert some of the coke to hydrocarbon product vapors, which are then combined with the vapors received from the cyclone separator and transferred to other facilities for further treatment. Meanwhile, catalyst particles are recovered from the stripper, and because only a small proportion of the coke was removed in the stripper, the catalyst is introduced into a regenerator wherein, by combustion in the presence of an oxygen-containing gas such as air, the remaining larger proportion of the coke is removed and the catalyst reactivated. The cyclic process is then completed by again blending the reactivated catalyst particles with the feedstock entering the FCC unit.

A major difficulty with cracking hydrocarbons in an FCC unit is presented when the hydrocarbon feedstock contains sulfur compounds, usually in the form of organic sulfur compounds. Ideally, the sulfur compounds in the feedstock are converted to $H_2S$ in the catalytic reaction and stripping zones so that all the contained sulfur in the feedstock is recovered as $H_2S$ with the low boiling hydrocarbon product vapors, which product vapors are then conveniently desulfurized by absorption of the $H_2S$ in an alkanolamine solution. But in practice, it has been found that some sulfur compounds remain (or are converted to forms which remain) with the coke on the deactivated catalyst recovered from the stripper. Hence, when the coke is combusted in the regenerator, a flue gas containing $SO_x$ compounds is produced.

The flue gas, if untreated, is a source of pollution. Although about 90–95% of the sulfur compounds entering an FCC unit with the feedstock are ultimately removed as $H_2S$ and other gaseous sulfur compounds, the remaining 5–10% left with the coke and converted to $SO_x$ compounds in the regenerator represents a significant environmental and engineering problem. For a typical FCC unit handling a feedstock containing about 1.5 weight percent sulfur components (calculated as elemental sulfur) fed at a rate of about 50,000 barrels per day, the amount of $SO_x$ compounds discharged from the regenerator in one day is between about 10 and 20 tons (calculated as $SO_2$).

Because of the concern created by the discharge of $SO_x$ compounds in such large quantities, various methods have been devised to reduce $SO_x$ emissions from FCC units to environmentally tolerable levels. Recently, attempts have been made to reduce such $SO_x$ emissions by recycling with the catalyst particles in the FCC unit a metal-containing component, commonly called a "sulfur getter," that reacts in the regenerator with the gaseous $SO_x$ compounds to yield a solid sulfur compound. The produced sulfur compound is then reconverted to the active "sulfur gettering" form by passage through the riser and stripper wherein $H_2S$ is released from the sulfur compound. The released $H_2S$ is then removed with the low-boiling hydrocarbons produced in the stripper and riser and separated from said low-boiling hydrocarbons, usually by contact with an alkanolamine solution.

One method illustrating the use of a "sulfur-getter" is described in U.S. Pat. No. 3,835,031, wherein magnesium oxide is incorporated on the catalyst as the "sulfur getter." In the regenerator, the magnesium oxide reacts with the $SO_x$ compounds to produce magnesium sulfate, thereby preventing the release of $SO_x$ compounds from the regenerator. As the catalyst particles are recycled through the catalytic cracking and steam stripping zones maintained in the riser and stripper, respectively, the magnesium sulfate is converted back to magnesium oxide while the contained sulfur is released as hydrogen sulfide and collected with the low boiling hydrocarbon products. Thus, the catalyst particles, when recycled to the regenerator again, contain a magnesium compound (i.e., magnesium oxide) in an active form for removing $SO_x$.

A similar FCC process is disclosed in U.S. Pat. No. 4,071,436. In this process, solid particles of reactive alumina are introduced into the FCC unit and are recycled with the catalyst particles. Again, as with the process previously described, the alumina particles remove $SO_x$ in the regeneration zone and are reactivated to forms once again active for remoxing $SO_x$ by passage through the riser and stripper.

In yet another process, set forth in U.S. Pat. No. 3,699,037, solid magnesium or calcium hydroxide particles are fed to the FCC unit to react with the $SO_x$ released in the regenerator, thereby producing magnesium sulfate or calcium sulfate and substantially reducing the $SO_x$ concentration of the flue gas discharged from the regenerator.

Although each of the foregoing processes may result in some desulfurization of the flue gas leaving the regenerator, none is completely satisfactory. In some instances, the "sulfur getter" not only reacts with the produced $SO_2$ but also interferes with the activity of the catalyst for yielding the intended low-boiling hydrocarbon product. In some instances, such as in the process described in U.S. Pat. No. 4,071,436, the "sulfur getter" is only about 0.5–2.0% reactive for removing $SO_x$ compounds, thereby causing inefficiency in the FCC unit by requiring the recycle of a material which is 98% or more inert. Another problem resides in the fact that the "sulfur getter" often proves difficult to reactivate, or, in the case of the process described in U.S. Pat. No. 3,699,037, the "sulfur getter" apparently is not at all capable of being reactivated in the riser and stripper under the usual conditions maintained therein.

Accordingly, it is an object of the invention to provide a process in which a "sulfur getter" is used to effectively remove $SO_x$ compounds from the regenerator flue gas without adversely affecting the activity or selectivity of the cracking catalyst. It is a further object to provide a "sulfur getter" which, once it has reacted with $SO_x$ compounds in the regenerator, is easily regenerated to its active form by passage through the riser and stripper of the FCC unit under the usual conditions maintained therein. It is a further object to provide a "sulfur getter" agent which comprises a relatively high proportion of material active for removing $SO_x$ compounds. It is yet a further object of the invention to increase the effectiveness of the "sulfur getter" by maximizing its degree (or extent) of dispersion upon the catalyst surfaces.

SUMMARY OF THE INVENTION

The invention is directed to preventing or reducing sulfur emissions, particularly in the forms of $SO_2$ and $SO_3$, from cyclic catalytic cracking processes in which petroleum feedstocks are refined into valuable hydrocarbon products in a catalytic cracking reaction zone and a steam stripping zone. More specifically, the invention comprises introducing into the catalytic cracking cycle an organic, aluminum-containing compound, such as aluminum isopropoxide (also known as aluminum isopropylate), in a manner such that aluminum compounds are dispersed and maintained relatively uniformly upon the surfaces of the catalyst particles. The dispersion so produced, while not affecting the activity of the catalyst particles, alternately (a) removes $SO_x$ compounds produced in the regeneration zone, thereby reducing the amount of $SO_x$ compounds discharged with the flue gas leaving the regenerator, and (b) releases the $SO_x$ compound so removed in the form of $H_2S$ during passage through the catalytic reaction and steam stripping zones of the cracking cycle, thereby reactivating said dispersion for removing more $SO_x$ compounds in the regeneration zone.

In addition to not interfering with the catalytic activity of the catalyst particles, the uniform dispersion of aluminum compounds on the surfaces of the catalyst particles provides maximum exposure of the aluminum compounds to the $SO_x$ compounds produced in the regeneration zone. As a result, the efficiency of the process for reacting the $SO_x$ compounds with the available aluminum compounds (or aluminum "sulfur getter") is maximized.

Because the typical catalytic cracking process is operated by continuously introducing fresh catalyst particles into, and continuously withdrawing catalyst particles from, the cracking unit at a rate sufficient to maintain the activity and selectivity of the recycling catalyst for the intended conversion in the catalytic cracking reaction zone, the aluminum-containing compound (or aluminum "sulfur getter") employed in the invention is added at a rate sufficient to maintain a dispersion of aluminum compounds in a proportion effective for continuously removing $SO_x$ in the regenerator. Thus, at steady state, the aluminum compounds dispersion on the recycling catalyst particles is maintained in an effective proportion in the range of 0.1–10.0 catalyst weight percent while the daily feed rate of the aluminum-containing compound (calculated as $Al_2O_3$) into the cracking cycle is substantially the same as the daily withdrawal rate of dispersed aluminum compounds (calculated as $Al_2O_3$) present on the catalyst particles being removed from the cracking unit.

Due to the reactivation feature of the dispersed aluminum compounds on the surfaces of the catalyst particles, it will usually be found in the practice of the invention that the amount of $SO_x$ compounds removed on a daily basis is more than the amount of $SO_x$ compounds which could have been removed based on the stoichiometry of the reaction of the added aluminum compounds with sulfur compounds to produce a compound or compounds having aluminum and sulfur in a ratio of 2:3, aluminum to sulfur. Thus, the feed rate of the aluminum-containing compound to the cracking unit is below stoichiometric, being sufficient both to maintain the dispersion of aluminum compounds (calculated as $Al_2O_3$) on the surfaces of the catalyst particles in the range of 0.1–10.0 catalyst weight percent and at the same time remove no less than 5 lbs. of $SO_x$ compounds (calculated as $SO_2$) in the regeneration zone for each pound of aluminum-containing compounds (calculated as $Al_2O_3$) fed to the cracking cycle.

All references herein to $SO_x$ compounds include within their meaning $SO_2$ and $SO_3$. References to sulfur-containing coke are directed to the coke deposits which accumulate on the catalyst particles and contain elemental sulfur, sulfur compounds, or both. As used herein, the introduction of an aluminum-containing additive in dissolved form into the cracking cycle includes within its meaning not only the introduction of liquids containing dissolved aluminum-containing components but also the introduction of solid aluminum-containing components which dissolve at least in part in the hydrocarbon feedstock. As calculated herein, catalyst weight percent (or catalyst wt.%) refers to the percentage proportion of the weight of a substance on the surfaces of the catalyst particles to the weight of the catalyst particles themselves, exclusive of any material thereon. Thus, for a catalytic unit, circulating 100 tons of catalyst having 5 tons of aluminum components (calculated as $Al_2O_3$) dispersed thereon, the aluminum components (as $Al_2O_3$) are present in a proportion of 5 catalyst weight percent.

BRIEF DESCRIPTION OF THE DRAWING

The drawing depicts the preferred embodiment of the invention in which an organic, aluminum-containing compound is blended in dissolved form with the hydrocarbon feedstock entering a typical fluidized catalytic cracking unit, the major components of which are shown in cutaway views.

DETAILED DESCRIPTION OF THE INVENTION

In accordance with this invention, the fluidized catalytic cracking (FCC) process, or other cyclic catalytic cracking process in which a hydrocarbon feedstock is refined to produce low-boiling hydrocarbon products by passage through a catalytic cracking reaction zone, is improved by introducing an aluminum-containing additive into the cyclic process to prevent the release of $SO_x$ compound with the flue gases emitted from the regenerator. The aluminum-containing additive may be any organic, aluminum-containing compound capable of being dissolved in the hydrocarbon feedstock or a liquid organic carrier. Preferably, the aluminum-containing compound is selected from the group consisting of aluminum isopropoxide ($Al(OC_3H_7)_3$), aluminum s-butoxide ($Al(OC_4H_9)_3$), aluminum acetylacetonate ($Al(C_5H_7O_2)_3$), and combinations thereof. The most preferred aluminum-containing compound or aluminum-containing "sulfur getter," however, is aluminum isopropoxide (or aluminum isopropylate).

The aluminum-containing additive may be introduced into the FCC unit at any convenient location, preferably in a manner that insures that the additive enters the catalytic cracking reaction zone in a dissolved or substantially dissolved form. In the preferred embodiment of the invention, the additive is introduced as a liquid directly into the hydrocarbon feedstock entering the catalytic cracking reaction zone. This is most easily accomplished by blending with said feedstock an organic solution comprising the additive dissolved in an organic carrier or solvent, such as xylene, toluene, methyl ethyl ketone, benzene, or isopropanol, with isopropanol being most preferred. Alternatively, a solid aluminum-containing additive is dissolved directly in the hydrocarbon feedstock, and the resulting feedstock-additive blend is accordingly introduced into the riser.

The process of the invention may be applied to any of those sulfur-containing hydrocarbon liquids which are usually treated in cyclic catalytic cracking processes to produce low-boiling hydrocarbons. Illustrative of such feedstocks include sulfur-containing gas oils, residual fractions, oil crudes, naphtha, and the like. The total concentration of sulfur in such feedstocks, whether the sulfur is present in elemental or combined forms or both, is usually between about 0.1 and 3.0 percent by weight (as sulfur) of the feedstock. Usually, almost all the contained sulfur in the hydrocarbon feedstock is present as organic sulfur compounds rather than free sulfur or inorganic compounds thereof.

In the preferred embodiment of the invention in which the aluminum-containing additive dissolved in isopropanol is blended with the incoming hydrocarbon feedstock to the FCC unit, the blend of feedstock and aluminum-containing additive is initially admixed with catalyst particles recovered from the regenerator hereinafter described in more detail. Suitable cracking catalyst particles for use herein include any high-activity cracking catalysts known in the art, especially high-activity fluidizable cracking catalysts. Generally, fluidizable cracking catalysts are in particulate form, usually of about 60–70 microns in diameter, and comprise silica-alumina with the alumina content being about 25–60 percent by weight of the catalyst particles. More commonly, the cracking catalysts will comprise crystalline aluminosilicates such as X and Y type zeolites. Preferred catalysts, however, comprise the Y type zeolite in a matrix of either synthetic silica-alumina or "beneficiated" natural clays, i.e., clays from which deleterious metal components have been removed. The crystalline aluminosilicates may be rendered more active by ion exchange, a method well known in the art by which the sodium and other metal ions in the aluminosilicate structure are exchanged for a rare earth metal ion, ammonium ion, or hydrogen ion. Such ion exchange methods usually reduce the sodium ion content of the aluminosilicate to a very low proportion, usually less than 0.5 percent by weight (as sodium).

The mixture of feedstock, aluminum-containing "sulfur getter" additive, and catalyst particles are then introduced into a riser wherein a fluidized catalytic cracking zone is maintained. Conditions in the riser are selected from those conventionally used to produce the required product from the feedstock. Typically, reaction temperatures and pressures are between about 750° and 1150° F. and 14 and 40 psig, respectively. Fluidizing velocity will usually be in the range of 20 to about 60 feet per second, and the residence time of the catalyst-feedstock blend within the riser is between about 2 and 60 seconds. The weight ratio of catalyst to oil will usually vary in the 2:1 to 15:1 range, and, preferably, the riser itself comprises a reaction vessel in which the blend of catalyst particles, hydrocarbon feedstock, and additive are fed vertically and concurrently. Also preferably, the ratio of weight to average diameter of the reaction vessel comprising the riser is at least 20, and most preferably at least 35.

Under the above conventional fluid catalytic cracking conditions, and with the blend of feedstock, additive, and catalyst particles moving cocurrently through the reaction zone, the feedstock is converted in the riser into valuable hydrocarbon products of lower average molecular weight and of lower average boiling point. Some of the feedstock, however, is converted to coke, which accumulates upon the surfaces of the catalyst particles and thereby deactivates such catalyst particles for further cracking of hydrocarbons into product hydrocarbons. Although much of the sulfur present in the original feedstock is largely collected with the product hydrocarbon vapors in the form of $H_2S$ and sulfur-containing hydrocarbonaceous vapors, a significant proportion of the sulfur remains in various organic forms with the coke deposited on the catalyst particles. Usually, the concentration of sulfur, in combined and elemental forms, in the coke ranges between about 1.0 and 12.0 percent by weight (as sulfur).

Concomitant with the production in the riser of product vapors, $H_2S$, and coke is the decomposition of the dissolved aluminum-containing additive in the feedstock to solid aluminum compounds that disperse relatively uniformly upon the catalyst surfaces with the coke. Such dispersion, due largely to the thorough and uniform dissolution of the aluminum-containing additive with the feedstock prior to its entry into the riser, is a most advantageous feature of the invention. The wide dispersal on the catalyst particles provides a thin film of "sulfur getter" material that is highly efficient for the subsequent removal of $SO_x$ compounds in the regenerator.

The materials withdrawn from the riser include product oil vapors, hydrogen sulfide, and deactivated catalyst particles containing dispersed aluminum compounds and coke. In a suitable separation zone, such as a cyclone separator, the product hydrocarbon vapors and hydrogen sulfide are separated from the deactivated catalyst particles and sent to conventional processing facilities for removing the hydrogen sulfide from the product vapors. The catalyst particles, however, are delivered to a stripper where, in the presence of steam, the coke on the catalyst is partially converted to valuable hydrocarbon vapors, while the sulfur compounds within the coke are partially converted to $H_2S$.

Conditions within the stripper are preferably maintained so as to recover as much H$_2$S-containing hydrocarbon product vapors as is economically possible. Usually, the temperature within the stripping vessel is held in the 850°–1050° F. range while pressures are suitable maintained at between about 25 and about 50 psig.

After being transferred to a suitable separator, such as a cyclone separator, the stripped catalyst is separated from a product gas containing hydrocarbon vapors and H$_2$S. The stripped catalyst is then transferred to a regenerator wherein, by contact at elevated temperatures in the 1000°–1500° F. range with a free oxygen-containing gas, such as air, passed countercurrently to the stripped catalyst, the coke not converted to product vapors in the stripper is combusted, thereby removing it from the catalyst particles. When the coke is removed from the catalyst particles such that said particles contain coke in a proportion less than about 0.5 catalyst weight percent, preferably less than about 0.2 catalyst weight percent, the catalyst particles are restored to an acceptably active state and are recycled to the riser.

Most of the catalyst particles recovered from the regenerator are recycled to the riser for use therein to crack hydrocarbons, but some is continuously removed from the FCC unit because, after many cycles of operation, the catalyst particles gradually lose activity. Thus, in a typical FCC unit, about 1–5 percent of the catalyst inventory is replaced by fresh catalyst each day.

Also discharged from the regenerator is a flue gas containing gaseous products of combustion. Normally, the amount of SO$_x$ compounds discharged from the regenerator is that represented by the total conversion of the sulfur in the combusted coke to SO$_2$ and SO$_3$, usually between 3 and 30 tons per day (calculated as SO$_2$) depending upon the size of the FCC unit and the concentration of sulfur within the coke. But due to the presence of the dispersed aluminum "sulfur getter" on the catalyst particles surfaces, the amount of SO$_x$ discharged with the flue gases is substantially reduced by the chemical reaction of the SO$_x$ with the "sulfur getter" to produce solid compounds containing both aluminum and sulfur atoms. Typically, in the preferred embodiment of the invention, the mass flow rate of SO$_x$ compounds (calculated as SO$_2$) discharged from the regenerator is reduced by at least 25 percent, often by at least 50 percent, depending upon such factors as the conditions used, the proportion of sulfur in the hydrocarbon feedstock, the proportion of sulfur in the coke, and the amount of aluminum "sulfur getter" distributed upon the catalyst particles surfaces.

An important advantage in the invention is that the aluminum-containing "sulfur getter," once it has been dispersed upon the catalyst, remains useful for removing SO$_x$ compounds from the gases produced in the regenerator. The dispersed aluminum "sulfur getter" alternately removes SO$_x$ compounds from the regenerator flue gases and subsequently releases it in the riser and stripper in the form of H$_2$S, which H$_2$S is removed with the other gases produced in the riser and stripper and ultimately is converted to sulfur in conventional treating facilities. The aluminum "sulfur getter" thus undergoes alternate changes in chemical form, involving oxidation reactions in the regenerator and reduction and hydrolysis reactions in both the riser and stripper operations. In the regenerator, the dispersed aluminum "sulfur getter" reacts with the SO$_x$ compounds, producing compounds containing both sulfur and aluminum atoms, such as aluminum sulfate and aluminum oxysulfate, thereby reducing the amount of SO$_x$ compounds discharged from the regenerator with the flue gas. In the riser, the compounds containing both aluminum and sulfur atoms and the dissolved aluminum compounds introduced with the hydrocarbon feedstock are converted at least in part to forms suitable for reacting with SO$_x$ compounds, most likely to the form of hydrated alumina (AlOOH). Reactions similar to those in the riser also take place in the stripper, resulting in the release of contained sulfur from the "sulfur getter" as H$_2$S and the rejuvenation of the "sulfur getter" to a form once again active for removing SO$_x$ compounds in the regenerator. Thus, typical chemical reactions occurring in the process of the invention are believed to be as follows:

In the Regenerator

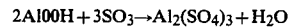
$$2AlOOH + 3SO_3 \rightarrow Al_2(SO_4)_3 + H_2O$$

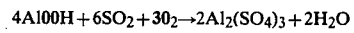
$$4AlOOH + 6SO_2 + 3O_2 \rightarrow 2Al_2(SO_4)_3 + 2H_2O$$

In the Riser And/Or Stripper

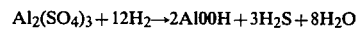
$$Al_2(SO_4)_3 + 12H_2 \rightarrow 2AlOOH + 3H_2S + 8H_2O$$

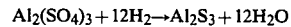
$$Al_2(SO_4)_3 + 12H_2 \rightarrow Al_2S_3 + 12H_2O$$

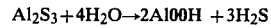
$$Al_2S_3 + 4H_2O \rightarrow 2AlOOH + 3H_2S$$

Since the dispersion of aluminum compounds alternately reacts with SO$_x$ compounds produced in the regenerator and is then reactivated to remove yet more SO$_x$ compounds, it can be expected that the daily amount of SO$_x$ removed will be relatively high in comparison to the daily amount of aluminum additive fed to the FCC Unit. In a typical FCC unit, the efficiency of SO$_x$ removal is such that the introduction of one pound of aluminum additive (calculated as Al$_2$O$_3$) per day with the hydrocarbon feedstock results in the removal of at least five pounds, usually between about 10 and 50 pounds, of SO$_x$ compounds (calculated as SO$_2$) per day. Thus, for the removal of between about 1 and 20 tons of SO$_x$ compounds per day, the usual rate at which the aluminum additive must be fed will vary between about 40 and 4000 pounds (calculated as Al$_2$O$_3$) per day. Usually the feed rate of the aluminum-containing additive will be such that an aluminum compound dispersion will lie upon the catalyst surfaces in a proportion in the range of 0.1–10.0 catalyst weight percent. Dispersions of aluminum compounds present in such proportions are effective for removing SO$_x$ compounds produced in the regenerator. Preferably, however, the dispersion of aluminum "sulfur getter" is present in a proportion in the range of 0.5–5.0 catalyst weight percent, with 2.0–3.0 catalyst weight percent being most highly preferred.

When present upon the catalyst in proportions less than about 5 catalyst weight percent, the aluminum "sulfur getter" dispersion does not significantly affect the activity of the catalyst particles for the desired catalytic cracking reactions in the catalytic cracking zone. This result is due largely to the high degree of dispersion of the aluminum compounds upon the catalyst surfaces, which high dispersion maximizes the contacting efficiency of SO$_x$ compounds with the aluminum "sulfur getter" and at the same time minimizes the deleterious effects which the presence of aluminum compounds on the catalyst has with respect to the intended conversion of the feedstock. As will be shown hereinafter in Example 2, essentially no degradation of catalytic properties results from the presence of the dispersed aluminum compounds on the catalyst.

It is an important feature of the preferred embodiment of the invention that a dispersion of aluminum compounds on the surfaces of the catalyst particles being recycled be maintained. Because the typical catalytic cracking process is operated by continuously introducing fresh catalyst into, and continuously withdrawing catalyst from, the cracking unit at a rate sufficient to maintain the activity and selectivity of the recycling catalyst for the intended conversion in the catalytic reaction zone, the aluminum-containing additive employed in the invention is added in a manner that maintains a dispersion of aluminum compounds in a proportion effective for continuously removing $SO_x$ compounds in the regenerator. Preferably, therefore, the aluminum-containing additive is fed continuously into the FCC unit to maintain the dispersion of aluminum compounds at the desired proportion. In alternative but non-preferred embodiments of the invention, however, the aluminum-containing additive is incrementally fed to the unit in predetermined amounts for predetermined time periods in order to maintain the dispersion in an effective proportion for removing $SO_x$ compounds.

The following Examples of the invention are provided for illustrative purposes only.

EXAMPLE 1

Referring now to the drawing, it will be shown how the process of the invention is utilized in a typical FCC unit recirculating 184 tons of catalyst at a rate of 360 cycle/day. A mixed gas oil boiling in the 600°–1100° F. range and containing 1.5 wt.% sulfur component (as sulfur) is fed at a rate of 46000 bpd through line 1. Blended with the mixed gas oil feedstock is aluminum isopropoxide dissolved in isopropanol and fed via line 2 at a rate of 620 lbs/day (155 lbs/day as $Al_2O_3$). In line 3 a solution of the gas oil and aluminum isopropoxide is recovered and blended with regenerated catalyst particles comprising rare earth Y zeolite fed at a rate of 66,240 tons/day through line 9. The regenerated catalyst contains, by catalyst weight, 2.50% of one or more dispersed compounds of aluminum (calculated as $Al_2O_3$) on their surfaces. The regenerated catalyst particles introduced by transfer line 9 carry the aluminum compounds (or the aluminum "sulfur getter") at a rate of 1656 ton/day (calculated as $Al_2O_3$).

The mixture of fresh catalyst particles, regenerated catalyst particles, and heavy gas oil containing dissolved aluminum isopropoxide is fluidized by methods well known in the art in hydrocarbon conversion riser 10, wherein a temperature of 900° F. or more is maintained. As the mixture is fluidized through the riser, the hydrocarbons of the gas oil are catalytically cracked under suitable conditions into hydrocarbons of lower molecular weight and lower boiling point. Hydrogen sulfide is released from the mixture, and coke containing sulfur compounds deposits upon the catalyst particles. The dissolved aluminum isopropoxide is converted to at least one aluminum compound highly and uniformly dispersed on the catalyst particles.

In one or more cyclone separators 11, which are suitably attached in stripping vessel 12 to the discharge of riser 10, a vaporous, $H_2S$- containing and hydrocarbon-containing gas is separated from the deactivated catalyst particles containing coke and dispersed aluminum compounds. The gas so separated, containing $H_2S$ and product hydrocarbons, is directed into header 13 for collection with gases produced in stripping vessel 12, and the combined gases are then transferred by conduit 14 to conventional desulfurization and fractionation equipment not shown. The catalyst particles, however, are passed by one or more diplegs 15 extending vertically and downwardly from each cyclone separator 11 into the lower portion of stripping vessel 12.

The accumulated catalyst particles in stripping vessel 12 are contacted with steam introduced via line 16 under conditions such that a portion of the coke is converted to vaporous hydrocarbons while some of the sulfur compounds present in the coke are converted to $H_2S$. A gas containing $H_2S$, steam, and vaporous hydrocarbons is thus produced in stripping vessel 12 and is collected in one or more cyclone separators 17 and passed to header 13 to collect with the gas obtained from cyclone separator 11. Entrained catalyst particles entering cyclone separator 17 are returned to the lower portion of stripping vessel 12 by dipleg 18.

After being subjected to steam stripping, the catalyst particles are transferred by line 19 to regenerator 20. These catalyst particles, due to their passage through riser 10 and stripper 12, now contain the dispersed aluminum compounds in one or more forms active for reacting chemically with $SO_x$ compounds. In addition, they contain whatever coke and sulfur compounds which were not removed by the steam stripping operation.

Regeneration is accomplished in regenerator 20 by combusting the coke on the catalyst particles in the presence of air introduced by feeder 21 in a direction countercurrent to that of the moving catalyst particles. A flue gas exits the regenerator by line 22 after passing through a cyclone separator 23-dipleg 24 arrangement similar to that in the stripping vessel for preventing the escape of entrained catalyst particles. The aluminum compounds dispersed upon the catalyst surfaces react with $SO_x$ compounds released in the regenerator during the combustion of the coke and are converted to compounds containing both aluminum and sulfur atoms. The flue gas thus produced in the regenerator is about 25% desulfurized in comparison to the flue gas which would have been produced had the dispersed aluminum compounds not been present upon the catalyst surfaces.

On a daily basis, it is estimated that the amount of $SO_x$ compounds (as $SO_2$) discharged from the regenerator may be reduced from 15 tons/day to 11¼ tons/day. The efficiency of such a process, in terms of tons of $SO_x$ compounds (calculated as $SO_2$) removed per ton of added aluminum isopropoxide (calculated as $Al_2O_3$) is 48.

Most of the regenerated catalyst particles produced in regenerator 20 are recycled as hereinbefore described via line 9 to be blended with the gas oil feedstock. Some, however, must be discharged to waste via line 25 because the catalyst gradually loses activity as it is recycle in the FCC unit. The rate at which catalyst particles are removed via line 25 is 6000 lbs/day, and the rate at which dispersed aluminum compounds, maintained upon the catalyst surfaces in a proportion of 2.50 catalyst weight % of (calculated as $Al_2O_3$) is removed at a rate of 150 lbs/day (calculated as $Al_2O_3$).

To provide a make-up for catalyst removed via line 25 and for catalyst lost as fines via lines 14 and 22, fresh catalyst is fed via line 4 at a rate slightly higher than the rate catalyst is removed via line 25. Assuming that about 200 lbs/day of catalyst fines carrying 5 lbs/day of aluminum compounds (as $Al_2O_3$) is lost via lines 14 and 22, the fresh catalyst must be fed at a rate of 6200 lbs/day through line 4.

EXAMPLE 2

Experiments were performed to determine if the presence of aluminum compounds on the surfaces of cracking catalyst particles would, during the catalytic cracking of a hydrocarbon feedstock, interfere with the activity and selectivity of the catalyst. In three separate experiments, a quantity of gas oil feedstock, differing in composition from that shown in Table I only as to the concentration of dissolved aluminum isopropylate therein (one feedstock contained no aluminum isopropylate, another 45 wppm, and the third 450 wppm (calculated as aluminum isopropylate)) was contacted with steam deactivated (i.e., steam pretreated) catalyst particles under identical cracking conditions.

More specifically, each of the three experiments was conducted as follows. Five grams of commercial, Davison Chemical CBZ-1 cracking catalyst particles were pretreated at 1380° F. for 17 hours at atmospheric pressure in a gaseous environment consisting of 100% steam. The five gram samples were then placed in a tubular reactor and maintained therein as a fixed bed. The temperature within the tubular reactor was held very nearly isothermally at 950° F. while the pressure was maintained at slightly above atmospheric. A sufficient amount of each of the three hydrocarbon feedstocks was introduced into the tubular reactor by means of a syringe to produce a catalyst to feedstock ratio (by weight) of 3.5. The catalytic reactions that occurred in the tubular reactor under the temperature and pressure conditions specified above were performed for a time period designed to simulate the equivalent of 14.6 weight hourly space velocity.

The product gases obtained from the three experiments were passed to a cold trap to condense out and collect the low-boiling liquid hydrocarbon product and the product gas. The liquid and gas products so obtained were analyzed to determine for each run the percentage volumertric conversion of the feedstock to product components and the yields of hydrogen and $C_1$–$C_3$ light hydrocarbon gases, mid-barrel fuels, coke, and gasoline, the latter being determined as the yield of liquid components that contain 5 or more carbon atoms and boil at temperatures of 400° F. or less.

Each of the three experiments was performed three times, and the analytical results obtained were averaged and tabulated in Table II. As shown, catalytic selectivity, in terms of the distribution of product yields, and the catalyst selectivity, in terms of the percentage conversion to overall products, were essentially the same, differing only within analytical error. Hence, the presence of aluminum compounds depositing upon the catalyst surfaces during the experiment resulted in no change in the activity or selectivity of the catalyst particles.

TABLE I
PROPERTIES AND CHARACTERISTICS OF GAS OIL FEEDSTOCK

ASTM DISTILLATION,
D 1160, °F.

| | | | |
|---|---|---|---|
| IBP/5 | 287/475 | Conradson Carbon, Wt. % | 0.10 |
| 10/20 | 526/574 | | |
| 30/40 | 637/685 | Nitrogen, Wt. % | 0.317 |
| 50/60 | 726/763 | | |
| 70/80 | 798/834 | Gravity, °API | 22.2 |
| 90/95 | 874/928 | | |
| Max | 966 | Sulfur, Wt. % | 1.14 |
| Recovery, Vol. % | 99.0 | | |

TABLE II

| | Feedstock With No $Al(OC_3H_7)_3$ | Feedstock With 45 wppm $Al(OC_3H_7)_3$ | Feedstock With 450 wppm $Al(OC_3H_7)_3$ |
|---|---|---|---|
| % Conversion (vol.) | 69.5 | 70.1 | 65.2 |
| % Gasoline (vol.) | 52.9 | 53.3 | 51.3 |
| % Mid Barrel (vol.) | 46.8 | 47.3 | 49.5 |
| % Coke (Wt. %) | 4.3 | 5.0 | 4.2 |
| $C_1$–$C_3$, SCF/bbl | 293 | 318 | 262 |
| $H_2$, SCF/bbl | 36 | 36 | 31 |

(It is noted with respect to the preceeding experiment that aluminum isopropylate was used in a concentration of 450 wppm to magnify any adverse effects resulting from the presence of aluminum compounds on the catalyst surfaces in commercial practice. But as shown by the data in Table II, the results obtained with 45 wppm and 450 wppm aluminum isopropylate were essentially the same, therefore indicating that the aluminum additive causes no significant adverse effects when blended with hydrocarbon feedstocks in the relatively low proportions (such as 45 wppm) contemplated in the preferred embodiment of the invention. Thus, although the invention in its broadest aspect embraces the use of large amounts of aluminum additive, such is not preferred.)

Although the invention has been described in conjunction with the preferred embodiment thereof, it is evident that many alternatives, modifications and variations of the invention will be apparent to those skilled in the art in light of the foregoing description. For example, although it is preferred that the aluminum-containing additive be blended with the feedstock to achieve uniform distribution of the aluminum "sulfur getter" on the catalyst surfaces, the same result can be accomplished by alternative methods. In one embodiment, the aluminum additive is sprayed in liquid form in the regenerator upon the catalyst particles therein being subjected to combustion for coke removal. In another embodiment, the additive is blended in solid form with the fresh catalyst being added to the FCC unit, with the result being that, once the additive dissolves with the hydrocarbon feedstock fed into the riser, the fluidizing conditions therein will cause the additive to distribute itself relatively uniformly upon the surfaces of the catalyst particles. Accordingly, it is intended to embrace within the invention all such alternatives, modifications and variations that fall within the spirit and scope of the appended claims.

I claim:

1. In a cyclical catalytic cracking process wherein a sulfur-containing hydrocarbon feedstock is fed to a catalytic cracking reaction zone and therein contacted with cracking catalyst particles at an elevated temperature, whereby said hydrocarbon feedstock is converted to product hydrocarbons while said catalyst particles become deactivated with sulfur-containing coke deposits, and said catalyst particles are reactivated in a regeneration zone by burning said coke off said cracking catalyst particles, thereby concomitantly producing an $SO_x$-containing flue gas, and said cracking catalyst particles are then recycled to said catalytic cracking reaction zone, the improvement comprising reducing the amount of $SO_x$ compounds carried with said flue gas by introducing into the catalytic cracking cycle one or more organic, aluminum-containing compounds in a manner such that dissolved aluminum-containing components enter the catalytic cracking reaction zone.

2. A process as defined in claim 1 wherein said organic, aluminum-containing compounds are selected from the group consisting of aluminum isopropoxide, aluminum s-butoxide, aluminum acetylacetonate, and combinations thereof.

3. In a cyclical catalytic cracking process wherein a sulfur-containing hydrocarbon feedstock is fed to a catalytic cracking reaction zone and therein contacted with cracking catalyst particles at an elevated temperature, whereby said hydrocarbon feedstock is converted to product hydrocarbons while said catalyst particles become deactivated with sulfur-containing coke deposits, and said catalyst particles are reactivated in a regeneration zone by burning said coke off said cracking catalyst particles, thereby concomitantly producing an $SO_x$-containing flue gas, and said cracking catalyst particles are then recycled to said catalytic cracking reaction zone, the improvement comprising reducing the amount of $SO_x$ compounds carried with said flue gas by maintaining a relatively uniform dispersion of aluminum components upon the surfaces of the recycled catalyst particles by introducing in said cyclical catalytic cracking process in dissolved form one or more organic, aluminum-containing compounds.

4. A process as defined in claim 3 wherein the feed rate at which the organic, aluminum-containing compounds are introduced into the catalytic cracking cycle is such that no less than 5 lbs of $SO_x$ compounds (calculated as $SO_2$) are removed in the regeneration zone for each pound of said aluminum-containing compounds (calculated as $Al_2O_3$) so introduced.

5. A process as defined in claim 3 wherein said aluminum containing compound is selected from the group consisting of aluminum isopropylate, aluminum s-butoxide, aluminum acetylacetonate, and combinations thereof.

6. In a fluidized catalytic cracking process comprising the cyclical steps of (1) contacting a sulfur-containing hydrocarbon feedstock stream with a bed of fluidized cracking catalyst particles in a catalytic cracking zone under conditions sufficient to produce a first product hydrocarbon stream having an average molecular weight and boiling point lower than that of the hydrocarbon feedstock stream and to further produce a stream of catalyst particles deactivated by the deposition of sulfur-containing coke upon the surfaces thereof; (2) steam stripping said catalyst particles to remove some of the sulfur-containing coke therefrom and produce a second product hydrocarbon stream; (3) removing the remainder of the sulfur-containing coke from said catalyst particles by combusting said coke in a regeneration zone in the presence of elemental oxygen, thereby reactivating said catalyst particles for the cracking reactions of step (1) and producing a $SO_x$-containing flue gas stream; and (4) recycling the regenerated catalyst particles to step (1), said process further comprising introducing fresh catalyst particles into, and withdrawing catalyst particles from, the stream of catalyst particles recycling through steps (1) to (4) at a rate sufficient to maintain the activity and selectivity of the recycling catalyst particles for converting said hydrocarbon feedstock into said first product hydrocarbon stream in said catalytic cracking reaction zone, the improvement comprising continuously dissolving in said sulfur-containing hydrocarbon feedstock one or more organic, aluminum-containing compounds such that, when the hydrocarbon feedstock is catalytically cracked in step (1), the aluminum-containing compound or compounds are converted to compounds of aluminum dispersed relatively uniformly upon the surfaces of the catalyst particles, said dissolving of said aluminum-containing compounds being at a rate such that, under steady state conditions, the proportion of dispersed aluminum compounds (calculated as $Al_2O_3$) maintained on the catalyst particles being recirculated through steps (1) to (4) is between about 0.1 and 10.0 catalyst weight percent while the amount of $SO_x$ compounds removed in the regenerator is no less than 5 lbs. (calculated as $SO_2$) for each pound of said aluminum-containing compounds (calculated as $Al_2O_3$) dissolved in said feedstock.

7. A process as defined in claim 6 wherein said organic, aluminum-containing compound is selected from the group consisting of aluminum isopropoxide, aluminum s-butoxide, aluminum acetylacetonate, and combinations thereof.

8. In a fluidized catalytic cracking process comprising the cyclical steps of (1) contacting a sulfur-containing hydrocarbon feedstock stream with a bed of fluidized cracking catalyst particles in a catalytic cracking zone under conditions sufficient to produce a first product hydrocarbon stream having an average molecular weight and boiling point lower than that of the hydrocarbon feedstock stream and to further produce a stream of catalyst particles deactivated by the deposition of sulfur-containing coke upon the surfaces thereof; (2) steam stripping said catalyst particles to remove some of the sulfur-containing coke therefrom and produce a second product hydrocarbon stream; (3) removing the remainder of the sulfur-containing coke from said catalyst particles by combusting said coke in a regeneration zone in the presence of elemental oxygen, thereby reactivating said catalyst particles for the cracking reactions of step (1) and producing a $SO_x$-containing flue gas stream; and (4) recycling the regenerated catalyst particles to step (1), said process further comprising introducing fresh particles to, and removing spent catalyst from, the catalyst particles recycling through steps (1) to (4) at a rate sufficient to maintain the activity and selectivity of the recycling catalyst particles for converting said hydrocarbon feedstock into said first product hydrocarbons in said catalytic cracking reaction zone, the improvement comprising maintaining a relatively uniform dispersion of solid aluminum components upon the surfaces of the catalyst particles recycled through steps (1) to (4) by introducing in said cyclical fluidized catalytic cracking process in dissolved form one or more organic, aluminum-containing compounds, said dispersion of solid aluminum components (calculated as $Al_2O_3$) comprising between about 0.1 and 10.0 catalyst wt.%, and said dispersion alternately comprising (a) solid aluminum compounds containing both sulfur and aluminum atoms produced by reacting $SO_x$ compounds in step (3) with the components of said dispersion and (b) solid aluminum compounds made active for reacting with $SO_x$ compounds in step (3) by passing said dispersion containing said solid aluminum compounds containing both sulfur and aluminum atoms successively through steps (1) and (2).

9. A process as defined in claim 8 wherein said organic, aluminum-containing compound is selected from the group consisting of aluminum isopropoxide, aluminum s-butoxide, and aluminum acetylacetonate.

* * * * *